Nov. 11, 1969   P. J. PLISHNER   3,477,537
ELECTRIC MOTOR-DRIVEN AUTOMOBILE
Filed Dec. 19, 1967
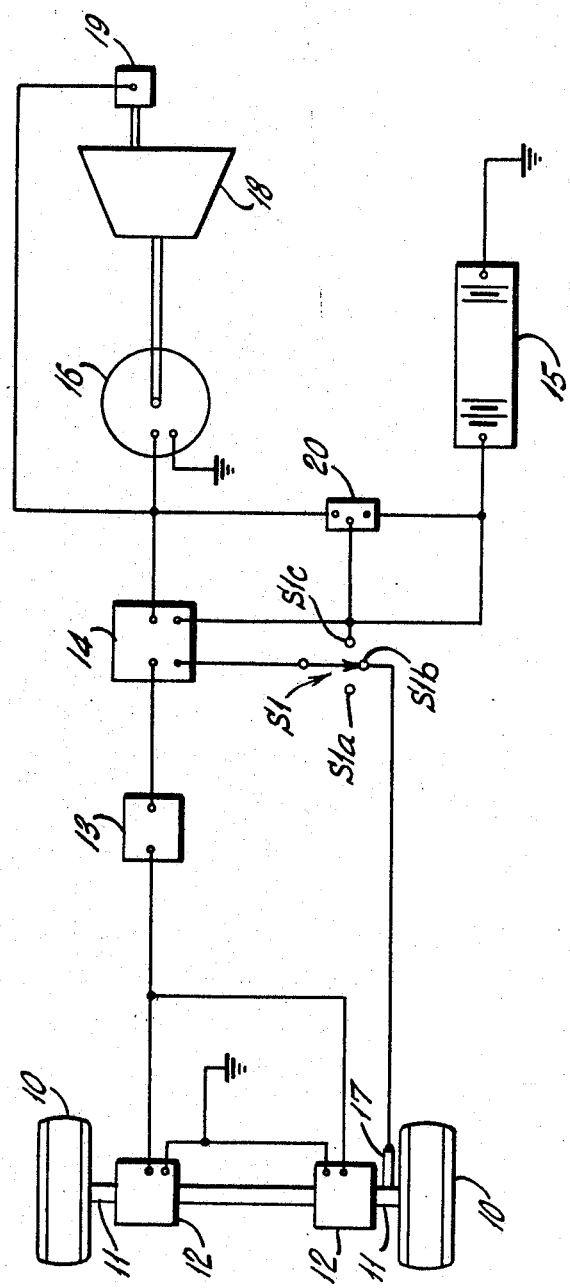
INVENTOR
PAUL J. PLISHNER
BY
William R. Liberman
ATTORNEY

United States Patent Office 3,477,537
Patented Nov. 11, 1969

3,477,537
ELECTRIC MOTOR-DRIVEN AUTOMOBILE
Paul J. Plishner, 6 Manitou Court,
Westport, Conn. 06880
Filed Dec. 19, 1967, Ser. No. 691,756
Int. Cl. B60k 1/00; B60l 11/12
U.S. Cl. 180—65      8 Claims

ABSTRACT OF THE DISCLOSURE

A motor vehicle includes electric motor-driven traction wheels, a gas turbine-driven electric generator regulated to provide a constant voltage output and a storage battery. A network responsive to the vehicle speed connects the motor through a motor speed control to the battery or generator when the vehicle speed is respectively below and above a predetermined value, and means are provided for selectively effecting these connections independently of the vehicle speed. The battery is connected to the generator through a voltage regulator to charge the battery.

BACKGROUND OF THE INVENTION

The present invention relates generally to improvements in motor vehicles and it relates particularly to a motor vehicle having a fuel-burning engine as its primary source of power.

The conventional automobile is a major contributor to air pollution by reason of the nature and composition of the exhaust gases of the internal combustion engines employed in the automobiles and the high concentration of automobiles in areas of high pollution. The contaminants in the engine exhaust gases are a consequence not only of improper and inefficient burning of the fuel but the presence of various additives and constituents which even under optimum conditions are emitted into the atmosphere and contribute greatly to the pollution thereof. Thus, even with the use of the automobile anti-pollution devices which are available and which have been proposed, the use of internal combustion engines for automobiles in congested areas still represents a major contribution to air pollution. Power cells and storage batteries have been proposed and employed for powering electric motor-driven automobiles but these are of very limited application and possess many drawbacks and disadvantages. The power cells which have been available are expensive devices and are highly hazardous for general use. The employment of storage batteries, while highly desirable as such, is of very limited application since with the available storage batteries and even with minimum vehicle weights, only a relatively small distance of travel is available with a full battery charge thus necessitating frequent battery recharging, permitting only short uninterrupted trips and otherwise leaving much to be desired.

SUMMARY OF THE INVENTION

A principal object of the present invention is to provide an improved motor vehicle.

Another object of the present invention is to provide an improved fuel-burning motor vehicle.

Still another object of the present invention is to provide an improved automobile thereby developing a greatly reduced contribution to air pollution.

A further object of the present invention is to provide an improved fuel-burning automobile of reduced air pollution contribution.

Still a further object of the present invention is to provide an automobile of the above nature characterized by its versatility, adaptability and reliability.

The above and other objects of the present invention will become apparent from a reading of the following description, taken in conjunction with the accompanying drawing which illustrates a preferred embodiment thereof.

In a sense the present invention contemplates the provision of a motor vehicle comprising a traction wheel, an electric motor drive coupled to said traction wheel, an electric generator, a fuel energized engine drive coupled to said electric generator, a storage battery and means selectively activated for connecting said electric motor to said electric generator and said storage battery.

According to a preferred form of the present vehicle, the fuel-burning engine is a gas turbine having a fuel feed controlled by the generator voltage to regulate the latter. A network is provided which is responsive to the vehicle speed and automatically alternatively connects the electric drive motor to the battery when the vehicle speed is below an adjustable predetermined value and to the generator when the vehicle speed is above said value. Manually-operable means are also provided to permit selective energizing of the electric motor by the battery or by the electric generator and control means are provided for varying the motor speed. The battery is connected to the generator by way of a battery voltage regulator and means may be provided for effecting a fast battery charge or for charging the battery independently of the use of the vehicle, as such.

Since normal urban driving speeds are below a predetermined value with highway speeds generally higher, the present vehicle will ordinarily be automatically battery-energized during urban driving and motor-generator-energized during highway driving. Since the air pollution is acute in the urban areas and is not yet a problem outside the urban areas, the contribution to air pollution by the present vehicle is thus radically reduced. In urban areas the vehicle being driven by the batteries, there is no air polluting exhaust and the burned gas exhaust is effected primarily in the nonurban areas where the motor generator is employed for energizing the drive motors and the air pollution problem does not exist as it does in urban areas.

BRIEF DESCRIPTION OF THE DRAWING

The drawing is a diagrammatic view of an automobile embodying the present invention.

DESCRIPTION OF THE PREFERRED EMBODIMENT

Referring now to the drawing which illustrates a preferred embodiment of the present invention, the improved vehicle includes a pair of suitably-supported traction wheels 10, each wheel 10 being connected by way of a corresponding drive shaft 11 or otherwise drive-coupled to a respective electric drive motor 12, in which case the motors may serve as part of a braking system, as by reversal of the motors. A variable speed DC motor of suitable power and having a 28-volt rating, or a 115 volt 400 cycle AC motor, or other, may be used. Motors 12 may be connected in parallel with one terminal of each of the motors being grounded and the other terminal connected to a speed control box or network 13 of known construction and associated with motors 12 in a well-known manner to permit the control of the speed of motors 12. Motors 12 are connected through control box 13 to a selector network 14 which alternatively connects motors 12 either to an accumulator or storage battery 15 or DC electric generator 16. Network 14 is connected to the arm of a three-way switch S1, one terminal S1a being open, the other terminal S1b being connected to the output of a voltage-generating tachometer 17 and the third terminal S1c being connected to the ungrounded terminal of battery 15. The network 14 is characterized in that it is responsive to the voltage generated by tachometer 17 so that motors 12 are connected through network 14 to the generator 16 when the tachometer signal is above a predetermined level. When the tachometer signal is below a predetermined level, motors 12 are connected through a control box 13 and network 14 to battery 15. Switch S1 may selectively cut out the control by the tachometer 17 and connect the motors 12 to the battery 15 by switching the arm into engagement with the contact S1a or may connect motors 12 to generator 16 by switching the switch arm to contact S1c. Any suitable means may be provided to shift the response voltage of network 14 so as to vary its response signal thereby varying the speed of the vehicle at which the motors are switched between generator 16 and battery 15.

Generator 16 is driven by a gas turbine 18 to which fuel is fed by adjustable feed means 19 such as a fuel pump or the like, the fuel feed being regulated in the known manner by the output of the generator 16 whereby to maintain a constant generator voltage output; that is, 28 volts in the present embodiment.

Generator 16 is connected to battery 15 by way of a suitable relay 20 which is controlled by the voltage of battery 15 whereby to connect the output of generator 16 to battery 15 when the voltage of the latter falls below a predetermined level. A battery rectifier charger (not shown) is provided to permit the charging of battery 15 from the line alternating current generally available, for example 110 or 220 volt AC, without the actuation of the motor generator.

Considering now the operation of the improved vehicle, a gas turbine 18 is fired to drive generator 16 which regulates the speed of turbine 18 whereby to maintain a constant voltage output at the generator 16. The motors 12 are then energized through to control box 13, which may be operated by a foot pedal, motors 12 being initially connected through the selector network 14 to battery 15 by reason of the low voltage generated by tachometer 17. When the vehicle reaches or exceeds a predetermined speed, for example 30 miles per hour, the voltage generated by tachometer 17 is sufficient to actuate selector network 14 to switch the motor from battery 15 to generator 16 which thereupon energizes motors 12. Upon vehicle 12 falling below the preset speed, for example 30 miles per hour, the motors 12 are switched back to batteries 15.

It should be noted that the motors energized by the network 14 may be removed from the control of the tachometer 17 by switch S1 so that the motor may be manually selectively energized by the generator 16 or the battery 15. Moreover, generator 16 will charge battery 15 when such battery requires charging as reflected by the battery voltage when the motor 12 is energized either by generator 16 or battery 15. Alternatively, when the vehicle is not used the battery 15 may be charged from the AC power line by means of a suitable rectifier which may be carried by the vehicle.

While there has been described and illustrated a preferred embodiment of the present invention, it is apparent that numerous alterations, additions and omissions may be made without departing from the spirit thereof.

I claim:
1. A motor vehicle comprising a traction wheel, an electric motor drive coupled to said traction wheel, an electric generator, a fuel-energized engine drive coupled to said electric generator, a storage battery, means selectively actuated for connecting said electric motor to said electric generator and said storage battery, and means responsive to the speed of said vehicle for controlling said connecting means alternatively to connect said electric motor to said battery and to said electric generator when said vehicle speed is below and above a predetermined speed respectively.

2. The motor vehicle of claim 1, including means for varying the speed of said electric motor.

3. The motor vehicle of claim 1, including means for connecting said storage battery to said generator to effect the charging of said storage battery.

4. The motor vehicle of claim 1, including means responsive to the voltage across said battery for connecting said battery across said electric generator when said battery voltage drops below a predetermined value.

5. The motor vehicle of claim 1, including means for feeding fuel to said engine and means responsive to the voltage output of said generator for controlling said fuel feeding means to regulate said generator voltage output.

6. The motor vehicle of claim 1, including means for selectively connecting said motor to said battery or to said electric generator independently of the speed of said vehicle.

7. The motor vehicle of claim 1, wherein said engine comprises a gas turbine.

8. The motor vehicle of claim 1, including means for varying the speed of said electric motor, means responsive to the voltage across said storage battery for connecting said battery across said electric generator when said battery voltage drops below a predetermined value, means for regulating the speed of said engine, and means for selectively connecting said motor either to said battery or to said electric generator independently of the speed of said vehicle.

References Cited
UNITED STATES PATENTS

| | | |
|---|---|---|
| 786,376 | 4/1905 | Nilson. |
| 1,275,201 | 8/1918 | Beach. |
| 1,423,124 | 7/1922 | Merle et al. |
| 2,581,596 | 1/1952 | Nims _____ 180—65 |

LEO FRIAGLIA, Primary Examiner

M. L. SMITH, Assistant Examiner

U.S. Cl. X.R.
290—16